June 12, 1928.
H. M. R. DAM
ELECTRIC BATTERY CELL
Filed May 1, 1925
1,673,403
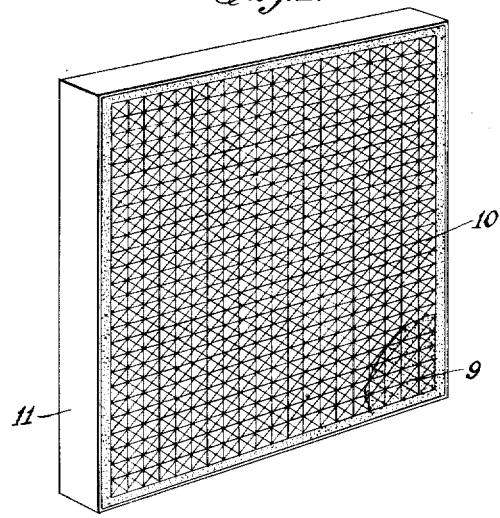
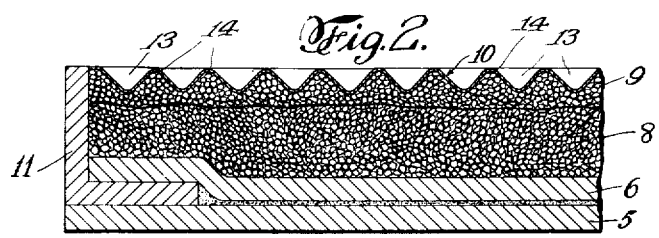
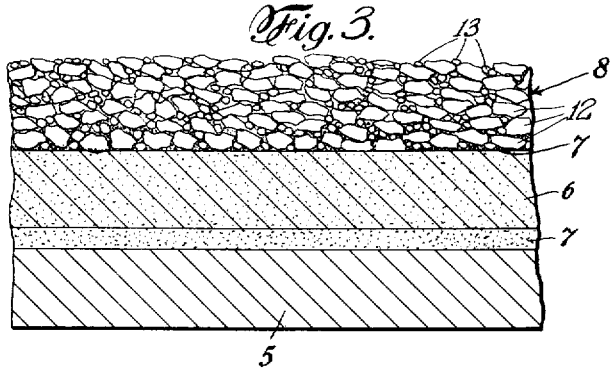
INVENTOR
Henry M. Rosendal Dam
BY
Williams & Morse
ATTORNEYS Patented June 12, 1928.

1,673,403

UNITED STATES PATENT OFFICE.

HENRY M. ROSENDAL DAM, OF ASTORIA, NEW YORK, ASSIGNOR TO PREMO ELECTRIC CORPORATION, A CORPORATION OF NEW YORK.

ELECTRIC BATTERY CELL.

Application filed May 1, 1925. Serial No. 27,134.

This invention relates to electric battery cells and has particular reference to cells of the flat or plate type.

Heretofore in the manufacture of electric battery cells, employing a carrier, such as pulp board or the like, it has been customary when employing an electrolyte in paste form, to apply the electrolyte to only that face of the carrier adjacent the negative electrode. It has been found that if the electrolyte is applied to both sides of the carrier there is a substantial increase in the ampere-hour capacity of the cell. Furthermore it has been found that even after a cell, so constructed, has been allowed to stand unused or inactive for a substantial length of time, it is able to immediately deliver its rated voltage when put into use.

Accordingly, objects of the invention are to obtain a very material increase in the ampere-hour capacity of a battery cell and a capacity for immediate delivery of the rated voltage of the cell when put into use even after a relatively long period of inactivity.

A further object of the invention is to provide a cell so constructed as to materially reduce the internal resistance thereof thus increasing the efficiency of the cell.

Other objects and certain advantages of the invention will become apparent from the following description when taken in connection with the accompanying drawings in which—

Figure 1 is a perspective view of a cell of the flat or plate type embodying my invention.

Figure 2 is an enlarged fragmental sectional view through the various elements entering into the cell structure.

Figure 3 is a fragmentary view on a still larger scale showing the relation of the electrolyte to the depolarizing mixture.

Referring to the drawings the numeral 5 indicates a negative electrode in the form of a zinc plate upon which is arranged a carrier element 6, preferably pulp board, adapted for the reception upon both sides thereof of a suitable electrolyte 7 in the usual paste form. Moisture is applied to the pulp board prior to the application of paste and this moisture serves as a medium for conducting the current through the pulp board in passing from one electrode to the other. Adjacent the carrier element 6 there is formed a layer of depolarizing mixture 8 compressed into cake form, and consisting of manganese dioxide and graphite. Upon the depolarizing mixture there is arranged a layer of graphite 9, compressed into cake form and constituting the positive electrode which may be provided with a metallic facing 10 such as tinfoil. The tinfoil 10 is applied to the face of the graphite before the graphite is subjected to pressure. In subjecting the graphite to pressure as by means of a plunger or die member (not shown) the compression face of which may be provided with pockets and projections, the tinfoil-covered-surface of the graphite is formed with a plurality of pockets and projections 13 and 14, respectively. This establishes an intimate physical union as well as an increased area of surface contact between the tinfoil facing and the graphite layer. Upon the outer margin of the electrode 5 is arranged a frame 11 of insulating material. This frame 11 includes a flat portion which is seated upon the outer margin of the electrode 5 and sustains the outer margin of the carrier element 6. The carrier element 6, cake of depolarizing material 8 and cake of graphite 9 are confined within the frame 11 and are united with such frame into a unitary structure according to the process set forth and claimed in my copending application Ser. No. 27,133, filed May 1, 1925.

The carrier element 6, instead of being coated on only that side adjacent to the zinc electrode 5, is coated upon both sides with the electrolyte and it has been found that with this distribution of the electrolyte a cell is produced having substantial advantages, among which are a very material increase in ampere-hour capacity, the immediate delivery of the rated voltage when the cell is put into use after a relatively long period of inactivity, and a material reduction in internal resistance of the cell.

From an inspection of Figure 3 it will be noted that the particles of manganese dioxide and graphite 12 and 13, respectively, of the depolarizing mixture 8 are shown relatively large. Only a relatively small portion of the surface of these particles is in contact with adjacent particles and likewise only a relatively small portion of the surface of the particles immediately adjacent the carrier element 6 is in contact with this element. Due to the relatively small contact area of the particles with the carrier an appreciable resistance is ordinarily offered to the flow of electric current from one electrode to the other. By applying electrolyte to the face of the carrier element adjacent the depolarizing mixture 8 the particles of the depolarizing mixture immediately adjacent the carrier element 6 are not only pressed into contact with the electrolytic paste but the paste yields and flows into the crevices or interstices between the particles upon the application of pressure which is used in carrying out the process of manufacture as described and claimed in the aforesaid application. Inasmuch as the electrolytic material enters the interstices it follows that electrical connection of low resistance between the several particles and the adjacent face of the carrier element 6 is established and as a result of the electrical connection thus afforded the internal resistance of the cell is necessarily low.

The presence of electrolyte intermediate the carrier element 6 and depolarizing mixture 8 maintains a suitable moist condition at the junction of these elements and this is true even if the cell is allowed to remain inactive for a relatively long period of time. The presence of moisture intermediate the depolarizing mixture and carrier enables the cell to immediately deliver its rated voltage without necessitating first establishing a temporary short circuit between the cell electrodes to produce a film of moisture at this place to enable the cell to function normally. Another advantage of a cell constructed in accordance with the invention disclosed herein resides in the fact that the amper-hour capacity of the cell is in the majority of cases more than double per unit of materials used.

Having thus described my invention I claim:

1. A battery cell comprising a negative electrode in plate form, a positive electrode in plate form, a depolarizing mixture arranged intermediate said electrodes and consisting of particles having interstices between them, and an electrolyte in paste form between one of said electrodes and said depolarizing mixture and extending uniformly a substantial distance.

2. A battery cell comprising a flat negative electrode, a flat positive electrode, a mass of depolarizing mixture in cake form arranged intermediate said electrodes and maintained in contact with said positive electrode, said depolarizing mixture being compressed into cake form and made up of particles having spaces between them, a carrier element arranged intermediate said depolarizing mixture and negative electrode, said carrier element being provided upon one face with an electrolyte in paste form in contact with said negative electrode and upon its opposite face with an electrolyte in paste form extending a substantial distance into said depolarizing mixture and filling spaces intermediate particles thereof.

3. A battery cell comprising a negative electrode in plate form, a frame of impervious insulating material having a flat portion seated only upon the margin of the electrode and an annular portion projecting from the margin of said electrode at an angle thereto, a cake of depolarizing mixture carried within said frame and superimposed upon said electrode and said flat portion, a cake of carbonaceous material in plate form superimposed upon said depolarizing mixture and constituting a positive electrode, and an electrolyte intermediate said negative electrode and depolarizing mixture.

In testimony whereof, I have affixed my signature to this specification.

HENRY M. ROSENDAL DAM.

---

CERTIFICATE OF CORRECTION.

Patent No. 1,673,403.    Granted June 12, 1928, to

HENRY M. ROSENDAL DAM.

It is hereby certified that error appears in the printed specification of the above numbered patent requiring correction as follows: Page 2, line 51, claim 1, after the word "distance" and before the period insert the words "into the interstices in the latter"; and that the said Letters Patent should be read with this correction therein that the same may conform to the record of the case in the Patent Office.

Signed and sealed this 17th day of July, A. D. 1928.

rier an appreciable resistance is ordinarily offered to the flow of electric current from one electrode to the other. By applying electrolyte to the face of the carrier element 6 adjacent the depolarizing mixture 8 the particles of the depolarizing mixture immediately adjacent the carrier element 6 are not only pressed into contact with the electrolytic paste but the paste yields and flows into the crevices or interstices between the particles upon the application of pressure which is used in carrying out the process of manufacture as described and claimed in the aforesaid application. Inasmuch as the electrolytic material enters the interstices it follows that electrical connection of low resistance between the several particles and the adjacent face of the carrier element 6 is established and as a result of the electrical connection thus afforded the internal resistance of the cell is necessarily low.

The presence of electrolyte intermediate the carrier element 6 and depolarizing mixture 8 maintains a suitable moist condition at the junction of these elements and this is true even if the cell is allowed to remain inactive for a relatively long period of time. The presence of moisture intermediate the depolarizing mixture and carrier enables the cell to immediately deliver its rated voltage without necessitating first establishing a temporary short circuit between the cell electrodes to produce a film of moisture at this place to enable the cell to function normally. Another advantage of a cell constructed in accordance with the invention disclosed herein resides in the fact that the amper-hour capacity of the cell is in the majority of cases more than double per unit of materials used.

Having thus described my invention I claim:

1. A battery cell comprising a negative electrode in plate form, a positive electrode in plate form, a depolarizing mixture arranged intermediate said electrodes and consisting of particles having interstices between them, and an electrolyte in paste form between one of said electrodes and said depolarizing mixture and extending uniformly a substantial distance.

2. A battery cell comprising a flat negative electrode, a flat positive electrode, a mass of depolarizing mixture in cake form arranged intermediate said electrodes and maintained in contact with said positive electrode, said depolarizing mixture being compressed into cake form and made up of particles having spaces between them, a carrier element arranged intermediate said depolarizing mixture and negative electrode, said carrier element being provided upon one face with an electrolyte in paste form in contact with said negative electrode and upon its opposite face with an electrolyte in paste form extending a substantial distance into said depolarizing mixture and filling spaces intermediate particles thereof.

3. A battery cell comprising a negative electrode in plate form, a frame of impervious insulating material having a flat portion seated only upon the margin of the electrode and an annular portion projecting from the margin of said electrode at an angle thereto, a cake of depolarizing mixture carried within said frame and superimposed upon said electrode and said flat portion, a cake of carbonaceous material in plate form superimposed upon said depolarizing mixture and constituting a positive electrode, and an electrolyte intermediate said negative electrode and depolarizing mixture.

In testimony whereof, I have affixed my signature to this specification.

HENRY M. ROSENDAL DAM.

CERTIFICATE OF CORRECTION.

Patent No. 1,673,403.  Granted June 12, 1928, to

HENRY M. ROSENDAL DAM.

It is hereby certified that error appears in the printed specification of the above numbered patent requiring correction as follows: Page 2, line 51, claim 1, after the word "distance" and before the period insert the words "into the interstices in the latter"; and that the said Letters Patent should be read with this correction therein that the same may conform to the record of the case in the Patent Office.

Signed and sealed this 17th day of July, A. D. 1928.